United States Patent
Brinker et al.

(10) Patent No.: US 6,708,589 B2
(45) Date of Patent: Mar. 23, 2004

(54) BRAKE ROTOR ASSEMBLY AND METHOD FOR MAKING SAME

(75) Inventors: Daniel Brinker, Troy, MI (US); Robert Veldman, Brighton, MI (US)

(73) Assignee: Metaldyne Machining & Assembly Company, Inc., Plymouth, MI (US)

( * ) Notice: Subject to any disclaimer, the term of this patent is extended or adjusted under 35 U.S.C. 154(b) by 81 days.

(21) Appl. No.: 09/803,785

(22) Filed: Mar. 12, 2001

(65) Prior Publication Data

US 2002/0174543 A1 Nov. 28, 2002

Related U.S. Application Data

(63) Continuation-in-part of application No. 09/414,113, filed on Oct. 8, 1999, now Pat. No. 6,485,109.
(60) Provisional application No. 60/136,535, filed on May 28, 1999.

(51) Int. Cl.$^7$ .............................. B23B 1/00; B23B 5/02
(52) U.S. Cl. .......................................... 82/1.11; 82/112
(58) Field of Search .......................... 82/1.11, 112, 155, 82/162, 163, 169, 173, 47; 451/63, 290; 29/434; 188/218 R, 218 L

(56) References Cited

U.S. PATENT DOCUMENTS

| | | |
|---|---|---|
| 2,891,435 A | 6/1959 | Billeter |
| 4,456,308 A | 6/1984 | Opel et al. |
| 4,699,431 A | 10/1987 | Daberkoe |
| 4,792,020 A | 12/1988 | Okumura et al. |
| 5,108,156 A | 4/1992 | Bell |
| 5,158,739 A | 10/1992 | Gente et al. |
| 5,209,701 A * | 5/1993 | Ishikawa et al. ......... 301/105.1 |
| 5,398,999 A | 3/1995 | Last |
| 5,430,926 A | 7/1995 | Hartford |
| 5,443,316 A * | 8/1995 | Deane et al. ............... 384/485 |
| 5,490,720 A | 2/1996 | Archibald |
| 5,653,153 A | 8/1997 | Greenwald |
| 5,680,801 A | 10/1997 | Keller |
| 5,884,980 A | 3/1999 | Visser et al. |
| 5,899,305 A | 5/1999 | Austin et al. |
| 5,915,502 A | 6/1999 | Rapisardi et al. |
| 5,937,499 A | 8/1999 | Austin et al. |
| 6,212,981 B1 | 4/2001 | Brinker et al. |
| 6,364,426 B1 * | 4/2002 | Horne et al. .......... 188/218 XL |

FOREIGN PATENT DOCUMENTS

| | | |
|---|---|---|
| EP | 0023881 | 7/1980 |
| EP | 0 065 127 A2 | 11/1982 |
| GB | 2 080 745 A | 2/1982 |
| GB | 2 198 995 A | 6/1988 |
| JP | 3091990 | 7/2000 |

* cited by examiner

*Primary Examiner*—Henry W. H. Tsai
(74) *Attorney, Agent, or Firm*—McDonald Hopkins Co., LPA

(57) ABSTRACT

A method for forming a brake assembly for a motor vehicle includes a wheel hub, a knuckle, and a brake rotor. The wheel hub includes a neck portion and a flange portion having a flange face. The flange face has a plurality of bolt receiving holes formed therein. The wheel hub is placed in rotational communication with the knuckle. The flange face of the wheel hub has a brake rotor secured thereto. The brake rotor has an inner surface, which is subjected to final finishing in order to reduce lateral run-out of the brake rotor.

32 Claims, 11 Drawing Sheets

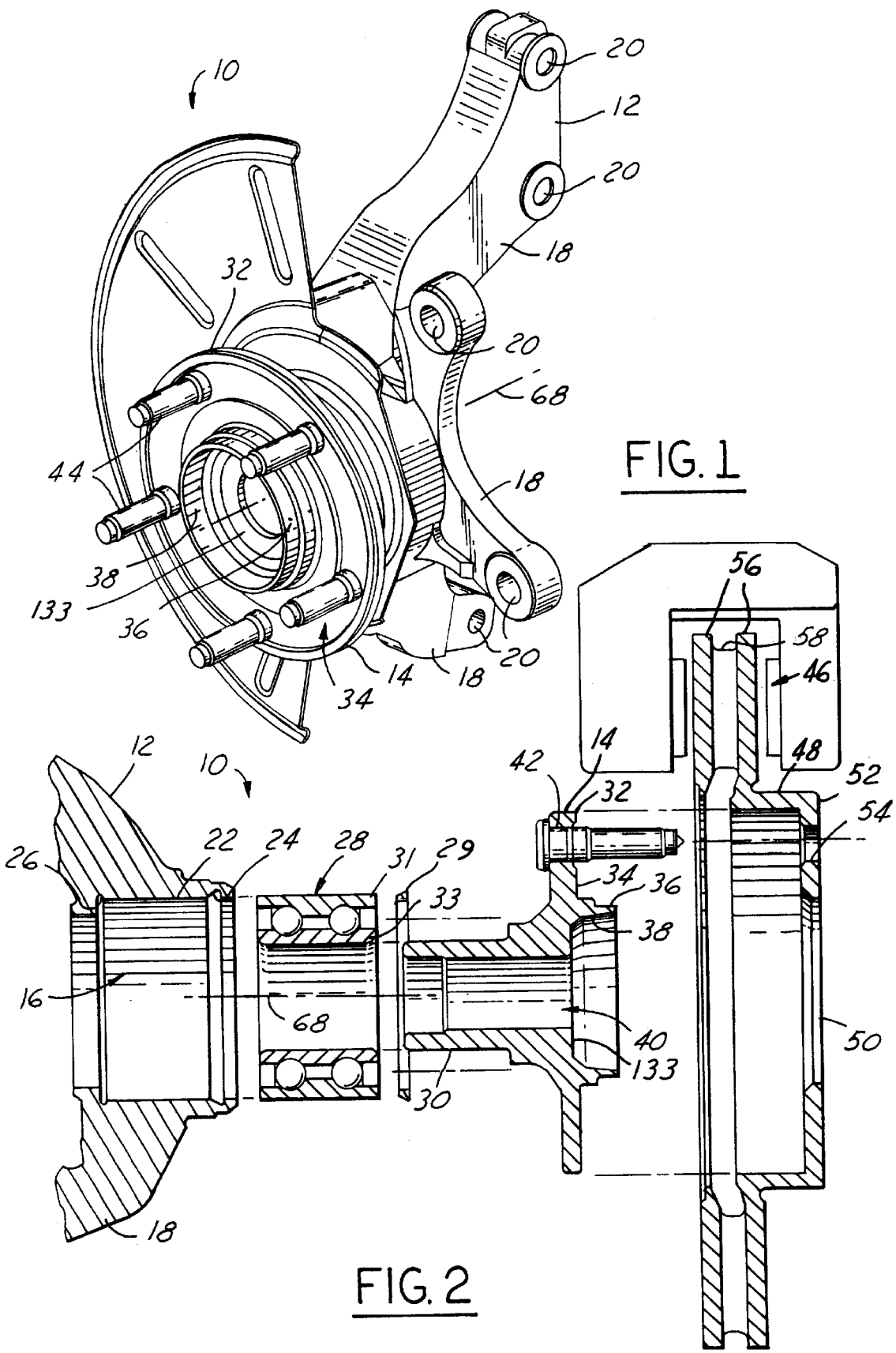

BRAKE ROTOR ASSEMBLY AND METHOD FOR MAKING SAME

CROSS-REFERENCE TO RELATED APPLICATIONS

The present application is a continuation-in-part of Applicant's U.S. patent application Ser. No. 09/414,113, filed Oct. 8, 1999, and entitled "KNUCKLE HUB ASSEMBLY AND METHOD FOR MAKING SAME, now U.S. Pat. No. 6,485,109 which claims priority from provisional application, Ser. No. 60/136,535, filed May 28, 1999.

TECHNICAL FIELD

The present invention relates generally to motor vehicle wheel end components. More particularly, the present invention relates to a brake assembly having a unique configuration and manufacturing process for reducing lateral run-out and a unique apparatus for machining the outer braking surfaces of a brake rotor.

BACKGROUND ART

Most motor vehicles today include disc brake systems for the front axle wheel assemblies and many further include disc brakes at the rear axle position. The disc brake rotor is a circular metal disc having opposed braking surfaces that are clamped by brake pads carried by a brake caliper to exert a braking effect. The wheel hub typically incorporates an anti-friction wheel bearing assembly in which one race of the bearing is coupled to the vehicle suspension and the other rotationally mounts the wheel hub, the brake rotor and wheel. Ordinarily, the rotating components of the rotor and hub assembly are manufactured separately and assembled together. This enables the brake rotor to be serviced and replaced if necessary during use. Moreover, the desired material characteristics for a brake rotor and the hub components are different. Although efforts to integrate these components have been proposed, such an approach has not found widespread acceptance.

In order to enhance performance of the braking system, it is desired to carefully and accurately control the dimensional characteristics of the rotor braking surfaces as the rotor rotates. The thickness variation of the disc and the lateral run-out or lateral deflection of the surfaces as they rotate need to be held to minimum tolerances. However, manufacturers have faced difficulties in achieving enhanced control over these tolerances due to the influence of several factors.

Most efforts to date have focused on decreasing run-out by controlling the dimensional characteristics of the rotor and therefore the relationship of the rotor surface to the wheel hub flange or surface. However, despite the fact that the tolerances and dimensional characteristics of the rotors have improved, performance and run-out problems still exist. These run-out problems are due in large part to other components of the wheel end assembly, including the bearing/hub assembly, which is comprised of a wheel hub and a bearing or the knuckle/hub assembly, which is comprised of a knuckle, a wheel hub, and a bearing.

One factor that contributes to this run-out is the stack-up of the individual components in a rotor/knuckle/hub assembly, i.e., their combined tolerances. While the tolerances of each part can be reduced when they are separately machined, when the parts are assembled, the combined tolerances stack up, causing run-out that is still relatively significant. Another factor that contributes to stack-up is any variation in the turning processes that are used to machine the wheel hub flange surface or the rotor surface, when the wheel hub and the rotor are individually machined, in an effort to make them flat. Further, the installation and press condition of the wheel bolts, the assembly process of the rotor/knuckle/hub assembly, and improperly pre-loaded bearings, can all cause misalignment of the rotor surface with respect to the brake pads and thus cause unacceptable run-out. This run-out can cause premature failure of the brake lining due to uneven wear which requires premature replacement of the brake lining at an increased expense. Further, problems due to run-out include, brake judder, steering wheel "nibble" and pedal pulses felt by the user, and warped rotors which result in brake noise and uneven stopping.

Presently available manufacturing methods and designs of rotors and knuckle hub assemblies to which the rotors are attached limit the accuracy to which lateral run-out of braking surfaces can be controlled. These methods and designs are also insufficient to solve the problems associated with run-out, as discussed above. Current methods typically involve finishing the rotor and the hub individually and then assembling the machined parts to form a completed brake rotor assembly. These methods, however, do not solve the run-out problems due to the factors discussed above, including stack-up tolerances, turning process variations, and wheel bolt and bearing installations.

Other options have been considered in an effort to solve the run-out problem, but they also all suffer from a variety of disadvantages. One contemplated option for reducing run-out is to separately decrease the run-out of each individual component, by decreasing their respective tolerances during manufacture and then assembling the components. The "stack up" of tolerance variations related to such an approach is still significant and provides only limited system improvement at an increased manufacturing cost. Another contemplated option includes tightening the press-fit tolerance variation between the knuckle, the wheel hub, and the bearing. This, however, significantly increases the difficulty in the assembly process as well as increases the manufacturing cost. Further, this option does not provide the desired reduction in system run-out.

It would therefore be advantageous to design a brake assembly for a motor vehicle that decreases system run-out without significantly increasing the manufacturing cost of the assembly or increasing the manufacturing difficulty.

SUMMARY OF THE INVENTION

It is therefore an object of the present invention to provide a brake assembly and a method for manufacturing same that provides reduced brake rotor lateral run-out.

It is a further object of the present invention to provide a brake corner assembly and a method for manufacturing same that results in a brake configuration which minimizes brake noise and uneven stopping.

It is still a further object of the present invention to provide a brake assembly and method for manufacturing same that results in a brake configuration which minimizes uneven brake lining wear and thus the need for frequent lining replacements.

It is a related object of the present invention to provide a brake assembly and a method for manufacturing same that results in a brake configuration which increases the life of vehicle brake linings.

It is yet another object of the present invention to provide a brake assembly and a method for manufacturing same that results in a brake configuration which provides improved performance at relatively lower cost.

It is yet a further object of the present invention to provide a tool to allow for the machining of a brake assembly to provide decreased lateral run-out on the outboard and inboard brake rotor faces.

In accordance with the objects of the present invention a brake assembly for a motor vehicle is provided. The brake assembly includes a knuckle having a plurality of apertures formed therein for attachment of the knuckle to a vehicle. The knuckle also includes a bearing retention portion. The knuckle bearing retention portion is in communication with a bearing through press-fitting. The bearing in turn is in rotational communication with a wheel hub. The wheel hub includes a neck portion that is pressed into the bearing, and a flange, having a flange face. The flange face has a plurality of bolt holes formed therein with each of the plurality of bolt holes receiving a wheel bolt passed therethrough. The flange face has a brake rotor secured thereto, which is finished such that it is parallel to the caliper mounting features, and wherein the brake rotor has minimal run out with respect to the bearing axis of rotation.

In accordance with another object of the present invention, a method for forming a knuckle/hub assembly having reduced run-out is provided. The method includes providing a knuckle having a generally circular bore formed therein. The generally circular knuckle bore has a bearing press-fit therein. A wheel hub having a neck portion and a flange portion with a flange face is provided. The flange face has a plurality of wheel bolts press-fit into bolt holes formed therein. The neck portion of the wheel hub is then journaled into the bearing such that the wheel hub can rotate with respect to the knuckle. A brake rotor is then secured to the wheel hub by locating it over the wheel bolts. Once the brake rotor is assembled to the wheel hub, the brake rotor surfaces are then final finished such that they are co-planar and parallel with respect to the caliper ears or pads.

In accordance with another object of the present invention, an assembly for holding a brake assembly while it is final finished is provided. The assembly includes a standard lathe machine with a fixture for clamping and locating the knuckle/hub assembly. The fixture applies a clamping force to the wheel hub and the inner race of the bearing to generate a pre-load on the bearing. The fixture also holds the knuckle in place so that the wheel hub may be rotated. Thereafter, the inner surface of the rotor is final finished so that it is flat and planar so as to provide minimal run-out when measured back to the brake assembly's axis of rotation.

These and other features and advantages of the present invention will become apparent from the following description of the invention when viewed in accordance with the accompanying drawings and appended claims.

BRIEF DESCRIPTION OF THE DRAWINGS

FIG. 1 is a perspective view of a knuckle/hub assembly in accordance with a preferred embodiment of the present invention;

FIG. 2 is an exploded cross-sectional view illustrating the components of a knuckle/hub assembly and a brake rotor in accordance with a preferred embodiment of the present invention;

BEST MODE(S) OF THE INVENTION

Figure 3:
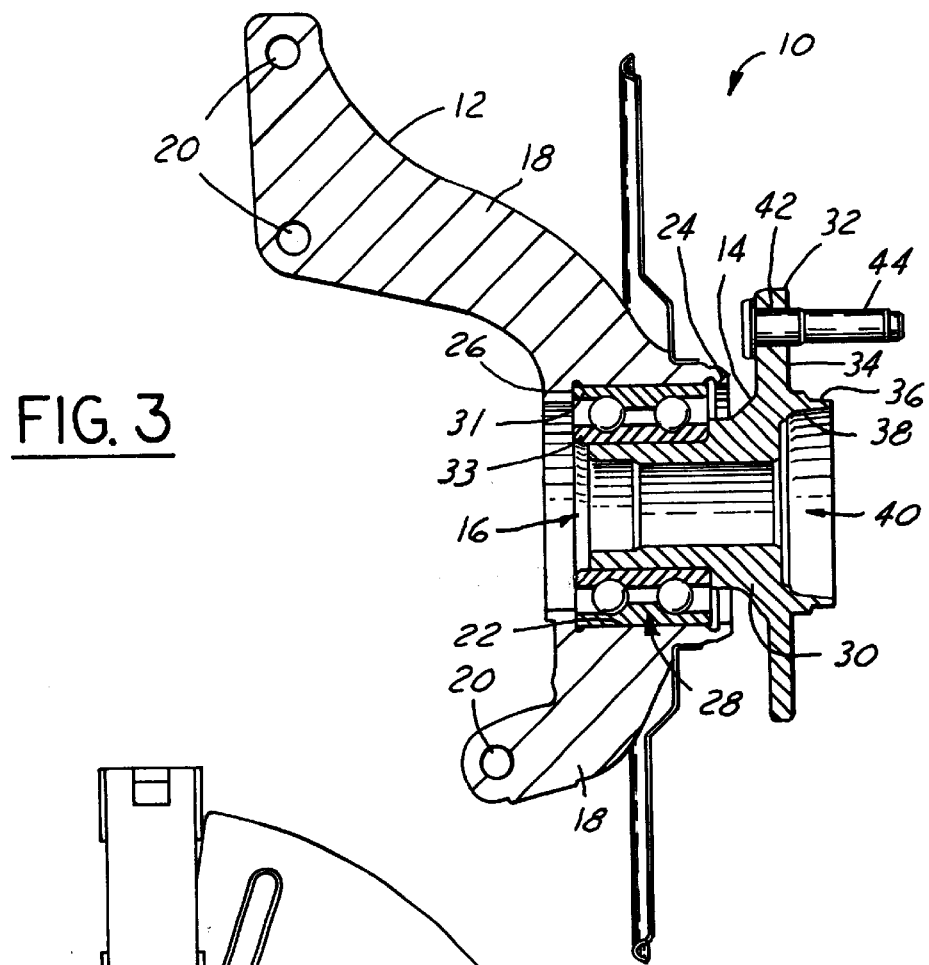
FIG. 3 is a cross-sectional view of the brake assembly in accordance with a preferred embodiment of the present invention.
Figure 4:
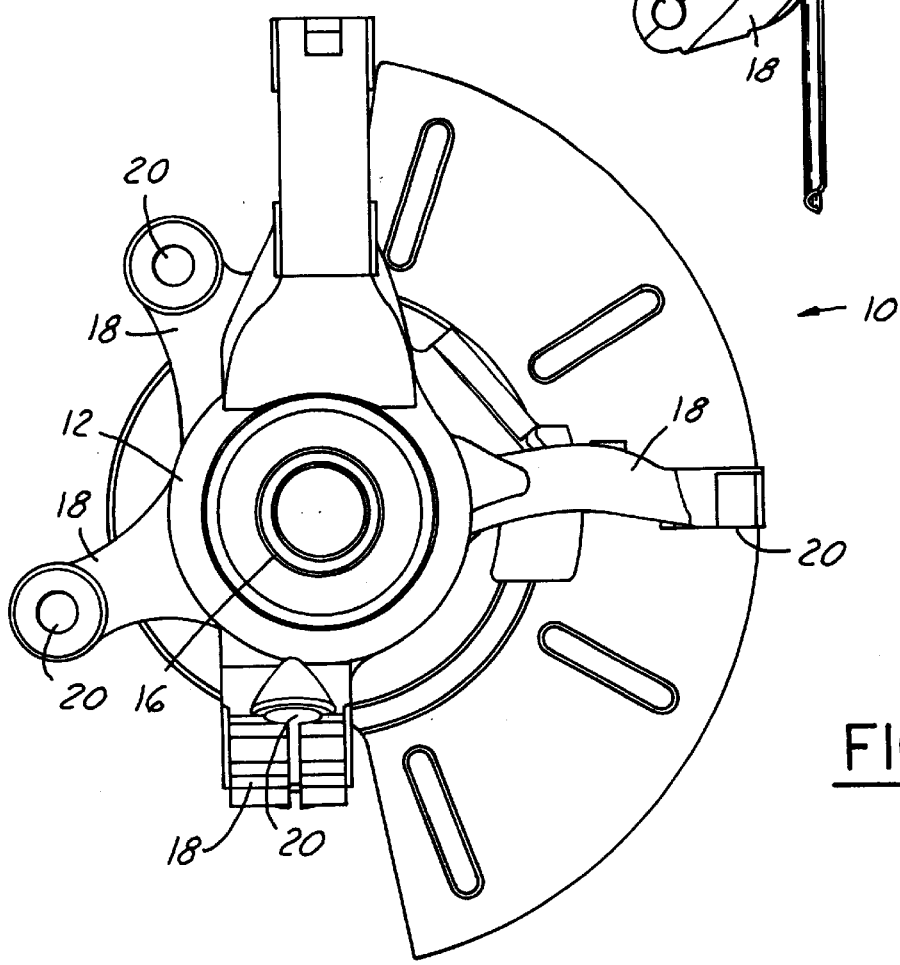
FIG. 4 is a rear view of a knuckle/hub assembly in accordance with a preferred embodiment of the present invention.

FIGS. 1 through 4 illustrate a preferred knuckle/hub assembly, as generally indicated by reference number 10, in accordance with the present invention. The assembly 10 is comprised of a variety of components, including a knuckle 12 and a wheel hub 14. The knuckle 12 is preferably constructed of metal and is generally formed by casting while the wheel hub 14 is preferably constructed of metal. The knuckle and hub can obviously be formed of other materials. The knuckle 12 preferably has a generally circular bore 16 formed therein and a plurality of outwardly extending appendages 18 that attach to the vehicle through a plurality of apertures 20 formed in the plurality of legs 18, as is well known in the art.

The bore 16 has a recess 22 formed therein bounded by an upper snap ring groove 24 and a lower snap ring 26 or shoulder for receiving a bearing 28 press fit therein. A snap ring 29 is preferably press fit or otherwise secured into the upper snap ring groove 24 prior to engagement of the bearing 28 with the knuckle 12. It should be understood that while the illustrated assembly has a bore 16 formed in the knuckle 12, the bearing 28 can be attached or secured to the knuckle 12 in a variety of configurations. For example, the bearing 28 can be mounted to an upper surface or other portion of the knuckle 12. Alternatively, the bearing 28 can be only partially disposed in the bore 16. Additionally, the bore 18 can be eliminated altogether.

The bearing 28 preferably has an outer race 31 and an inner race 33. However, it should be understood that a variety of different bearings may be utilized as well as a variety of different knuckle/bearing attachment configurations. For example, instead of being press-fit with a snap ring, i.e., between the upper retention ring 24 and the lower retention ring 26, the bearing 28 may be press-fit without a snap ring and held in place with a nut or other known securing methods. Alternatively, the outer race 31 may be integrally formed with the knuckle 12 or may be configured as an orbital formed outer race rotation bearing/knuckle assembly. Further, the bearing outer race 31 could alternatively be bolted to the knuckle 12 such that the inner race 33 rotates with the wheel hub 14. Moreover, the inner race 33 may be integrally formed with the wheel hub 14. Further, a spindle configuration having a non-driven outer race rotation may also be utilized.

In the preferred embodiment, the wheel hub 14 has a neck portion 30 and a flange portion 32. The neck portion 30 is preferably pressed into contact with the inner race 33 of the bearing 28 so that the wheel hub 14 can rotate with respect to the knuckle 12, as shown in FIG. 3. Alternatively, the neck portion 30 may be integrally formed with the inner race 33 or the outer race 31. It should be understood that other wheel hub/bearing configurations may also be utilized.

The flange portion 32 has a flange face 34 and a wheel and rotor pilot portion 36. The wheel and rotor pilot portions 36 extend generally upwardly from the flange face 34 and has an inner surface 38, which defines a spline 40. The wheel hub 14 also has a plurality of bolt holes 42 formed in the flange face 34 through which a plurality of respective wheel bolts 44 are passed. The plurality of wheel bolts 44 are attached to the flange face 34 in a predetermined pattern and on the same pitch circle diameter. The wheel bolts 44 are oriented with the threaded ends extending outwardly so as to connect a rotor 46 (FIGS. 2 and 3) and associated wheel onto the hub 14 in a fashion, which is more clearly described below. Alternatively, the wheel hub 14 may have bolt holes 42 that receive lug nuts that are attached to a vehicle wheel and are passed through the bole holes 42 when the wheel is attached to the wheel hub 14.

As best shown in FIGS. 2 and 3, the rotor 46 comprises a cup 48 with a central aperture 50 adapted to receive therethrough a wheel shaft (not shown) affixed to the wheel and rotor pilot portions 36 and extending outwardly from the flange face 34. The cup 48 is dimensioned to receive the hub flange portion 32 and includes at its outer end an annular flange 52 having a plurality of apertures 54 lying in the same pitch circle diameter relative to the wheel shaft as the wheel bolts 44 and having a similar pattern so as to accommodate the wheel bolts 44 therethrough.

A pair of parallel, annular discs 56 spaced from each other by a plurality of rectangular fillets 58 extend outwardly from the cup 48 and define braking surfaces for a plurality of brake calipers (not shown). The completion of the assembly to the wheel is done by positioning the wheel over the bolts 44 and the threading nuts (not shown) over the bolts 44 so as to secure the wheel between the nuts and the rotor 46. This invention addresses, among other things, the problems, which occur between the mating surfaces of the hub flange portion 32 and the rotor 46.

Figures 5, 6:
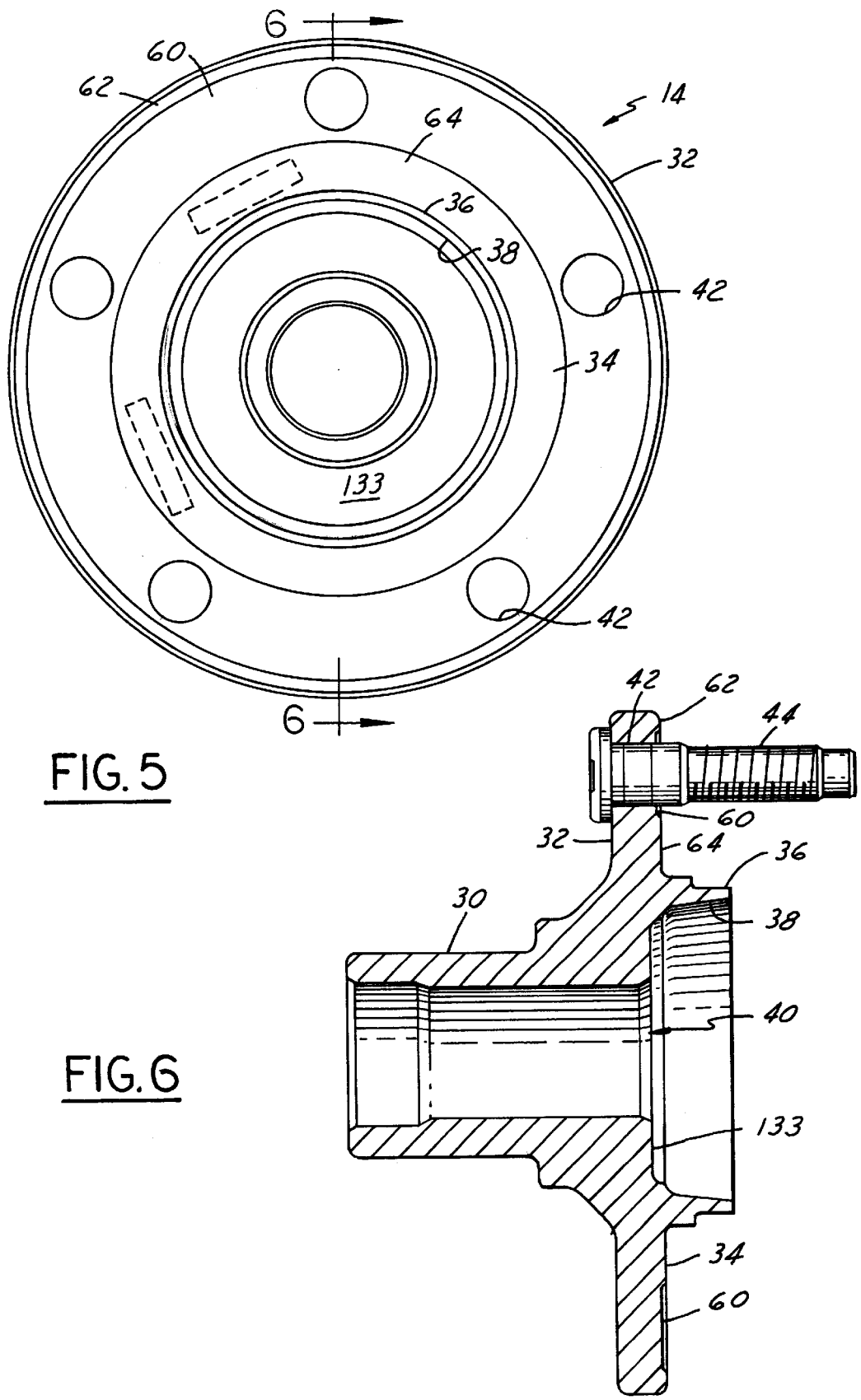
FIG. 5 is an end view of a wheel hub flange face in accordance with a preferred embodiment of the present invention.
FIG. 6 is a cross-sectional view of the wheel hub of FIG. 5 along the line 6—6.

Turning now to FIGS. 5 and 6, which illustrate the preferred wheel hub 14 and flange portion 32 of the present invention. The flange face 34 has a relief channel 60 machined therein. It should be understood that the relief channel 60 may also be forged into the flange face 34 or may be formed by other known methods. The relief channel 60 divides the flange face 34 into an outer flange surface 62 and an inner flange surface 64. The relief channel 60 is turned into the flange face 34 so that the plurality of bolt holes 42 lie in the relief channel 60. The plurality of bolt holes 42 may be formed either before or after the relief channel 60 has been formed. The relief channel is preferably set below the level of the flange face 34, this is to eliminate any surface unevenness caused by press-fitting the wheel bolts 44 into the bolt holes 42. Any unevenness due to press-fitting of the wheel bolts 44 is compensated for by the relief channel 60 as any unevenness will not be raised with respect to the flange 62, 64, and therefore does not contribute to any run-out. The relief channel 60 also allows for final finishing or finish turning to be performed on the assembly 10 after the bolts 44 have been seemed to the wheel hub 14.

The relief channel 60 is preferably formed in the flange surface 34 prior to the knuckle 12, the bearing 28, and the wheel hub 14 being assembled. However, it should be understood that the relief channel 60 can be formed in the flange surface 34 after the wheel hub 14 is assembled to the bearing 28 and the knuckle 12 and before the wheel studs 44 are press-fit therein. In accordance with the preferred method of forming, the wheel hub 14 has the relief channel 60 formed therein. Thereafter, the outer flange surface 62 and the inner flange surface 64 are finished. After the finishing process has been completed, the wheel bolts 44 are press fit into the bolt holes 42. Thereafter, the hub 14 is mounted to the bearing 28 and the knuckle 12 to form the completed knuckle/hub assembly 10.

The assembly 10 is then placed into a clamping apparatus, as is discussed in more detail below, where it is finish turned or final finished to provide a flat outer flange surface 62 and a flat inner flange surface 64 that will contact the rotor 46 and thus, minimize any run out. The refinishing will provide an inner flange surface 64 and an outer flange surface 62 that are co-planar with respect to each other so as to provide a flat flange surface 34. The re-finishing process minimizes run-out with respect to not only the rotor, but also to the center of rotation of the assembly 68, as established by the bearing 28. Further, the method and configuration of the present invention allows the distance between the caliper ears and the flange surfaces 62, 64 to be accurately controlled. Additionally, the parallelism between the caliper ears and the flange surfaces 62, 64 can also be accurately controlled. In the preferred embodiment, each flange surface has a flatness of 20 $\mu$m or better. Additionally, the run-out is minimized to 14 $\mu$m or better and the co-planarness of the inner and outer surfaces 62, 64 is 20 $\mu$m or better. However, the flatness requirements may be varied.

FIGS. 7 through 12 illustrate a preferred part clamping fixture 70 in accordance with the present invention. The part clamping fixture 70 is preferably incorporated into a lathe machine (not shown) and is used to locate and hold the brake assembly 300 in which is comprised of the rotor 46 attached to the knuckle/hub assembly 10 for refinishing, in accordance with the process described above.

Figure 7:
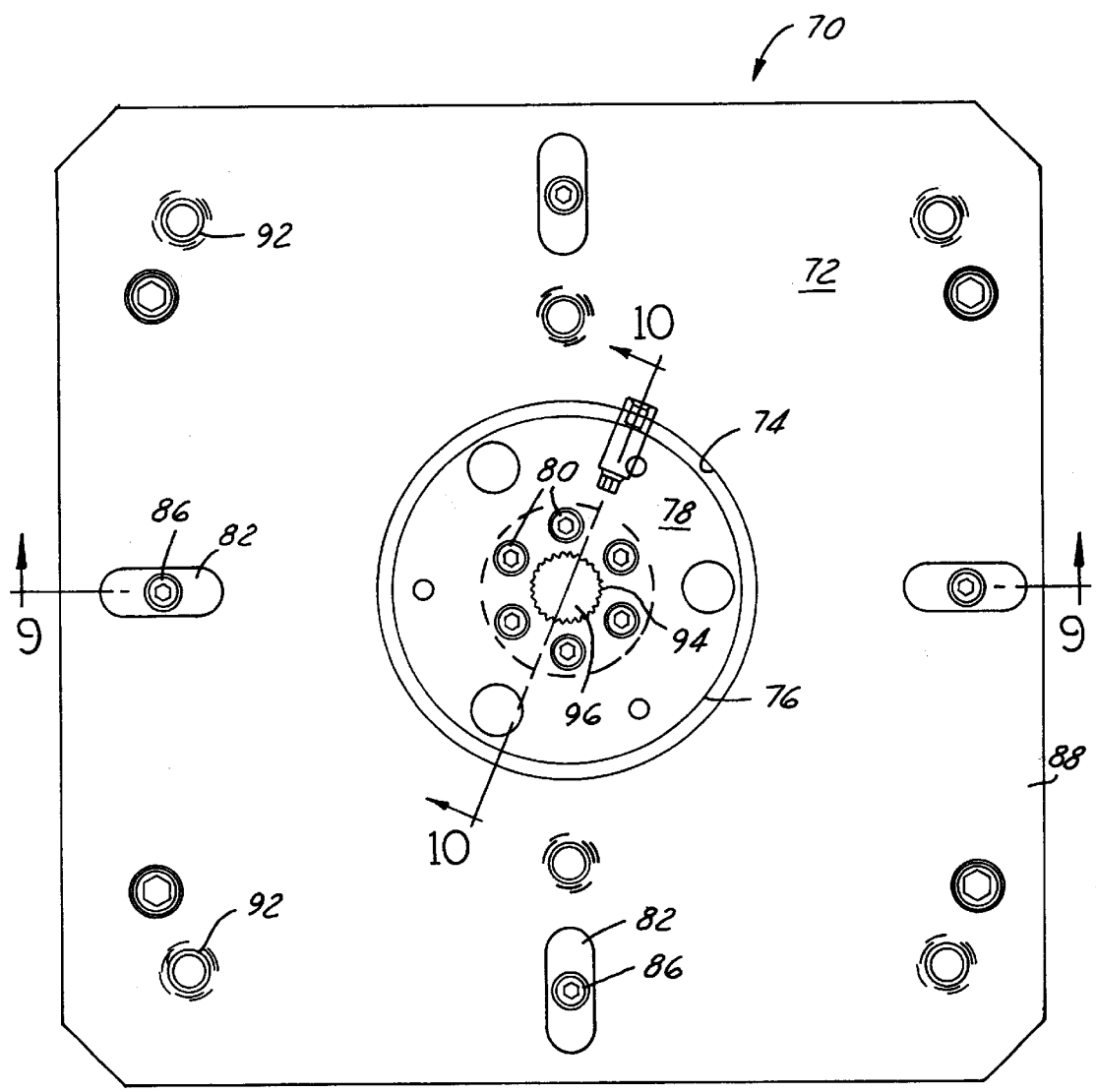
FIG. 7 is a top view of a manufacturing fixture assembly for use in the generation of a knuckle/hub assembly in accordance with a preferred embodiment of the present invention.
Figure 8:
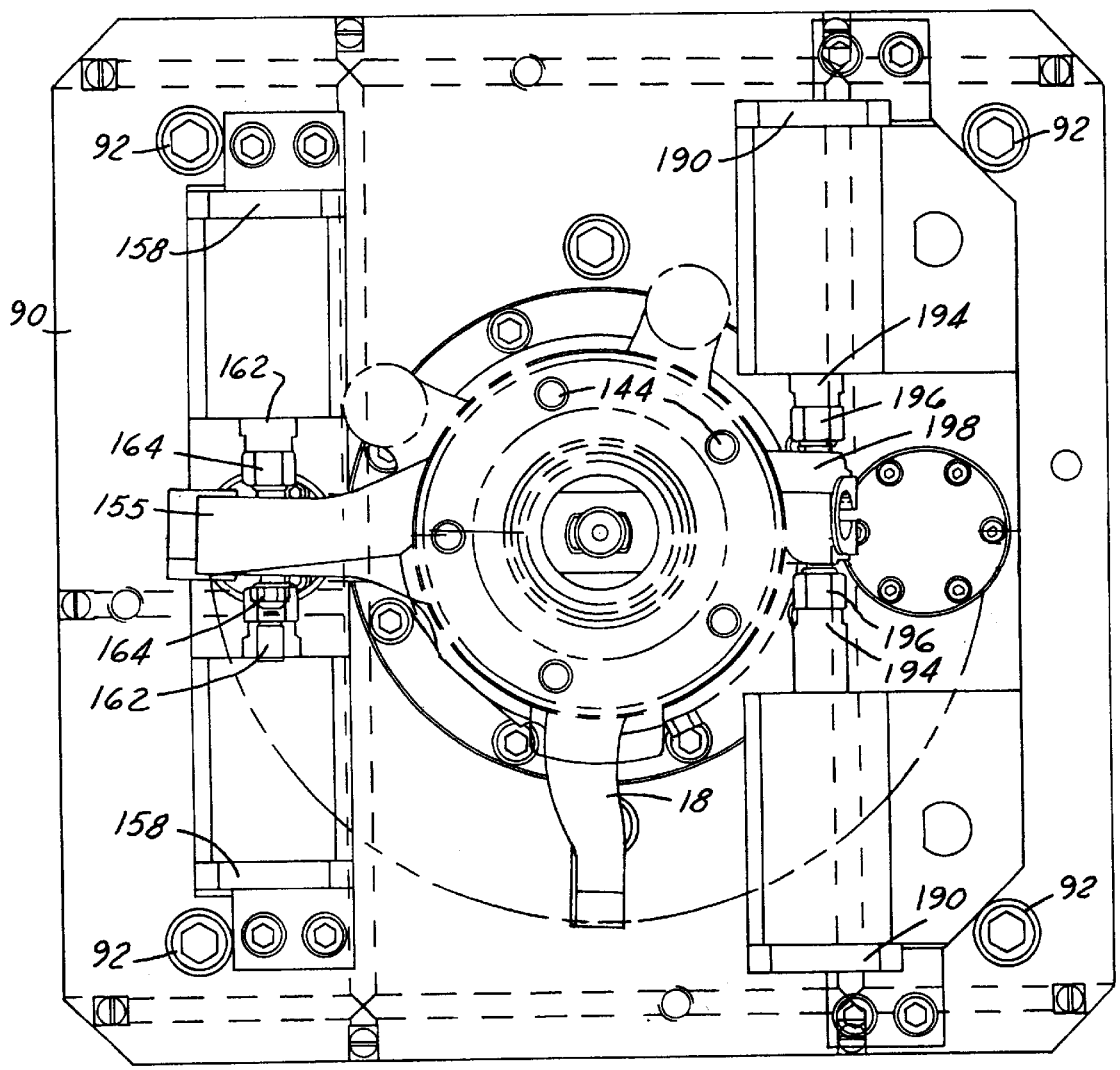
FIG. 8 is a bottom view of a manufacturing fixture assembly with a knuckle/hub assembly clamped therein in the direction of the arrow 8 in FIG. 9 in accordance with a preferred embodiment of the present invention.

As shown in FIG. 7, the part clamping fixture 70 includes a generally flat top surface 72 for abutting a portion or surface of the lathe machine. The generally flat top surface 72 includes an opening 74 formed therein in which a split collar 76 is generally positioned for engagement with a drive motor from the lathe. The split collar 76 is disposed such that it is rotatable with respect to the opening 74. The split collar 76 has a top surface 78 with a plurality of drive motor engagement notches 80 that communicate with the drive motor from the lathe in order to rotate the split collar 76.

With reference to FIGS. 7 through 12, the part clamping fixture 70 is shown in more detail. The fixture 70 includes a plurality of keys 82 that fit into recesses 84 formed in the generally flat top surface 72. The keys 82 have fasteners 86 that pass through both the keys 82 and the generally flat top surface 72 to secure the keys 82 to a spacer plate 88. The spacer plate 88 is disposed on top of a base plate 90 with the two plates 88, 90 being secured by standard fasteners 92 that extend through the generally flat top surface 72.

The split collar 76 has a bore 94 formed therein in which a toothed gear 96 is disposed. The toothed gear 96 is secured to a puller member 98 that, when lowered by the lathe, extends generally downward and into communication with the knuckle 12. The toothed gear 96 is rotatable with respect to the split collar 76 and is supported at a bottom surface 100 by a u-joint adapter 102 that has a central opening 104 formed therein that encompasses the puller member 98.

The part clamping fixture 70 has a right housing portion 106, a right cover portion 108, and a right pull piston 110 disposed in the right housing portion 106. The part clamping fixture 70 also includes a left housing portion 114, a left cover 116, and a left pull piston 118 disposed within the left housing portion 114. Both the right pull piston 110 and the left pull piston 118 are secured to the base plate 90 by respective fasteners 112, 120. Each of the right housing portion 106 and the left housing portion 114 are moveable with respect to the respective pull pistons 110, 118 such that respective chambers 122, 124 are formed between each housing portion 106, 114. Each chamber 122, 124 has an orifice 126, 128 in fluid communication therewith allowing fluid to enter and exit the respective chamber 122, 124 to assist in moving the right and left housing portions 106, 114 upwardly and downwardly. The left and right chambers 122, 124 are sealed from their respective housings 106, 114 by a plurality of o-rings 130. Obviously any other sealing mechanism may alternatively be utilized. The left pull piston 118 is preferably smaller in length and diameter than the right pull piston 110 to ensure that equal forces are applied to the knuckle 12. It should be understood that the size of the pull pistons 110 and 118 may vary depending upon the knuckle configuration.

Figure 9:
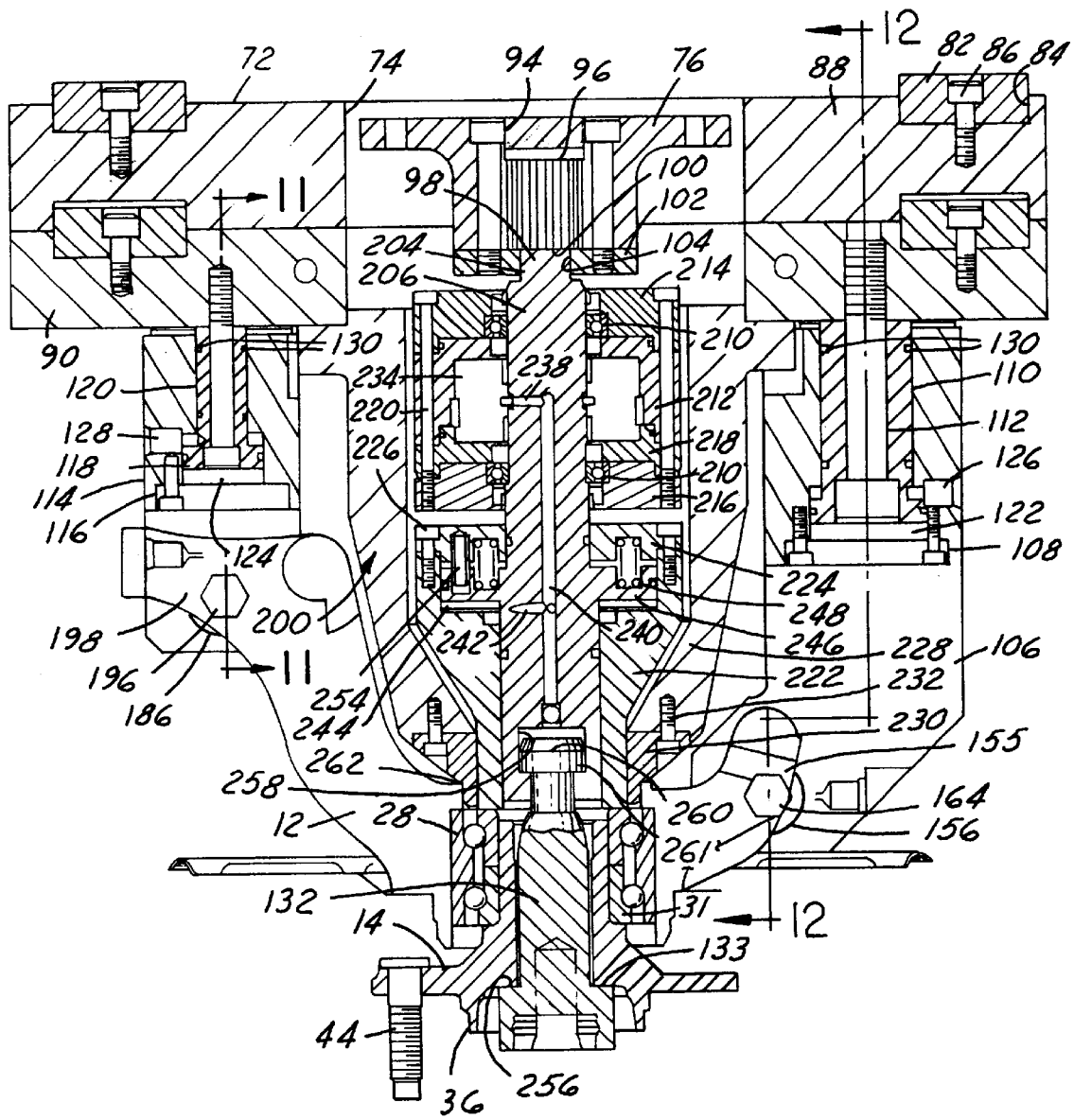
FIG. 9 is a cross-sectional view of the manufacturing fixture assembly and brake assembly clamped therein of FIG. 7 in the direction of the arrows 9—9.

As shown in FIG. 9, a bayonet 132 is preferably inserted into the spline 40 defined by the inner surface 38 of the wheel pilot portion 36 of the flange portion 32. The bayonet 132 is for engagement with the puller member 98 to lift the brake assembly 300, as described in more detail below. The bayonet 132 preferably engages a washer bore or face 133 in order to lift the assembly 10.

Figure 11:
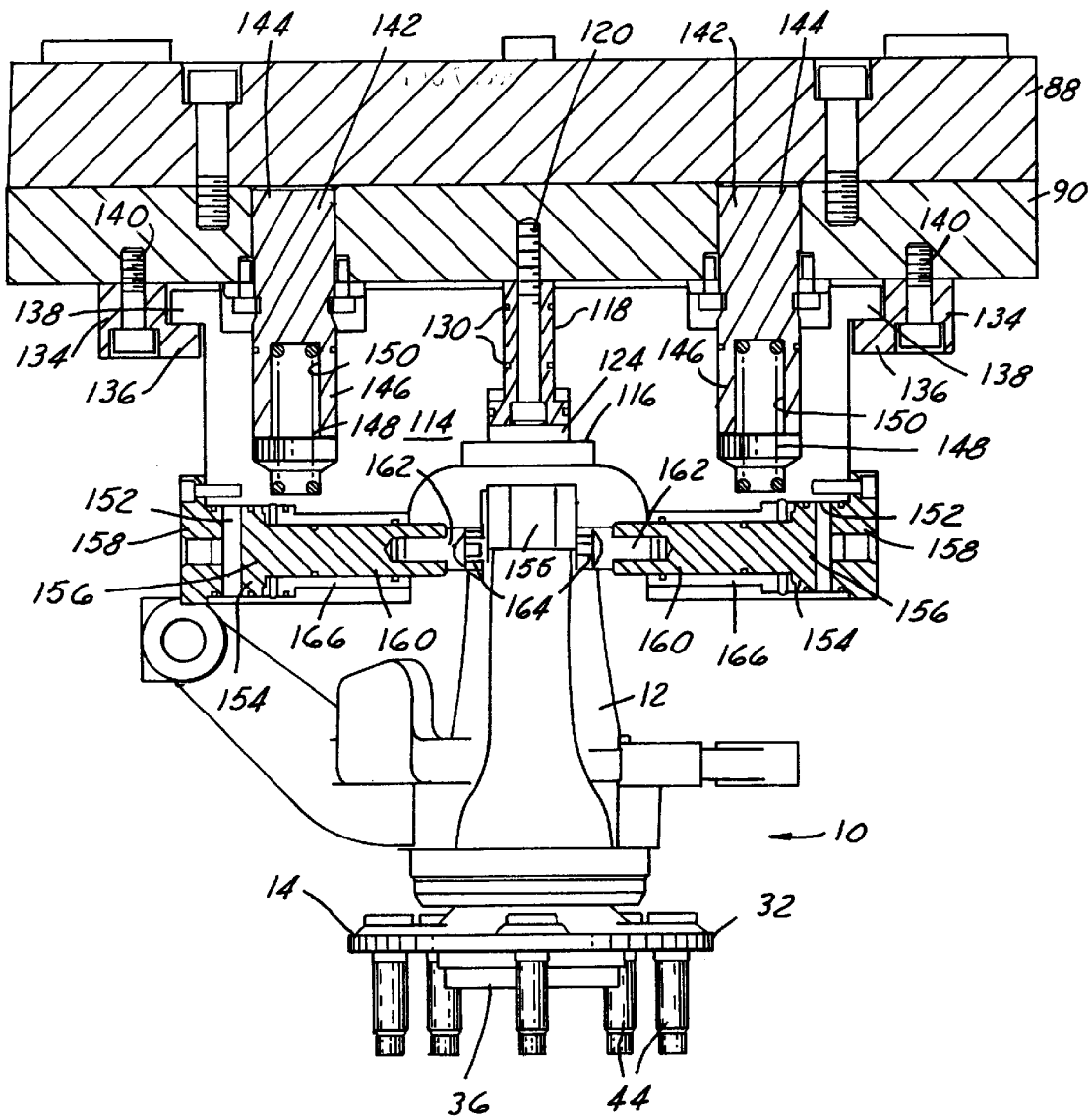
FIG. 11 is a cross-sectional view of the manufacturing fixture assembly, with a knuckle/hub assembly positioned therein, of FIG. 9 in the direction of the arrows 11—11.

As shown in FIG. 11, the right housing portion 106 is retained in proximity with the base plate 90 by a pair of retaining blocks 134. Each of the retaining blocks 134 has a supporting portion 136 that engages a flange portion 138 of the right housing portion 106. Each of the retaining blocks 134 is secured to the base plate 90 by a fastener 140 or the like. A pair of guide pins 142 are disposed in the right housing portion 106. Each of the guide pins 142 is secured to the base plate 90 at an upper end 144 and each is in communication with a spring 146 at a lower end 148. Each spring 146 fits within a recess 150 formed in the lower end 144 of each of the guide pins 142 and extends downwardly into contact with the right housing portion 106. The biasing force from the springs 146 helps bias the right housing portion 106 away from the guide pins 142.

As also shown in FIG. 11, the right housing portion 106 includes a pair of bores 152 within which a respective piston 154 reciprocates. Each piston 154 moves between a normally unengaged position and a knuckle engaging position. The bores 152 are each sealed adjacent the outer ends 156 of the pistons 154 by an end cap 158. The inner ends 160 of each of the pistons 154 has a gripper portion 162 and a swiveling gripper portion 164 which allow the piston 154 to engage and hold the upper strut arm 155 of the knuckle 12 when the piston 154 is in the knuckle engaging position. Each piston 154 reciprocates within a bushing 166 secured within the respective bore 152 to ensure proper alignment of the gripper portions 162 and the swiveling gripper portions 164 with respect to the upper strut arm 155.

Figure 12:
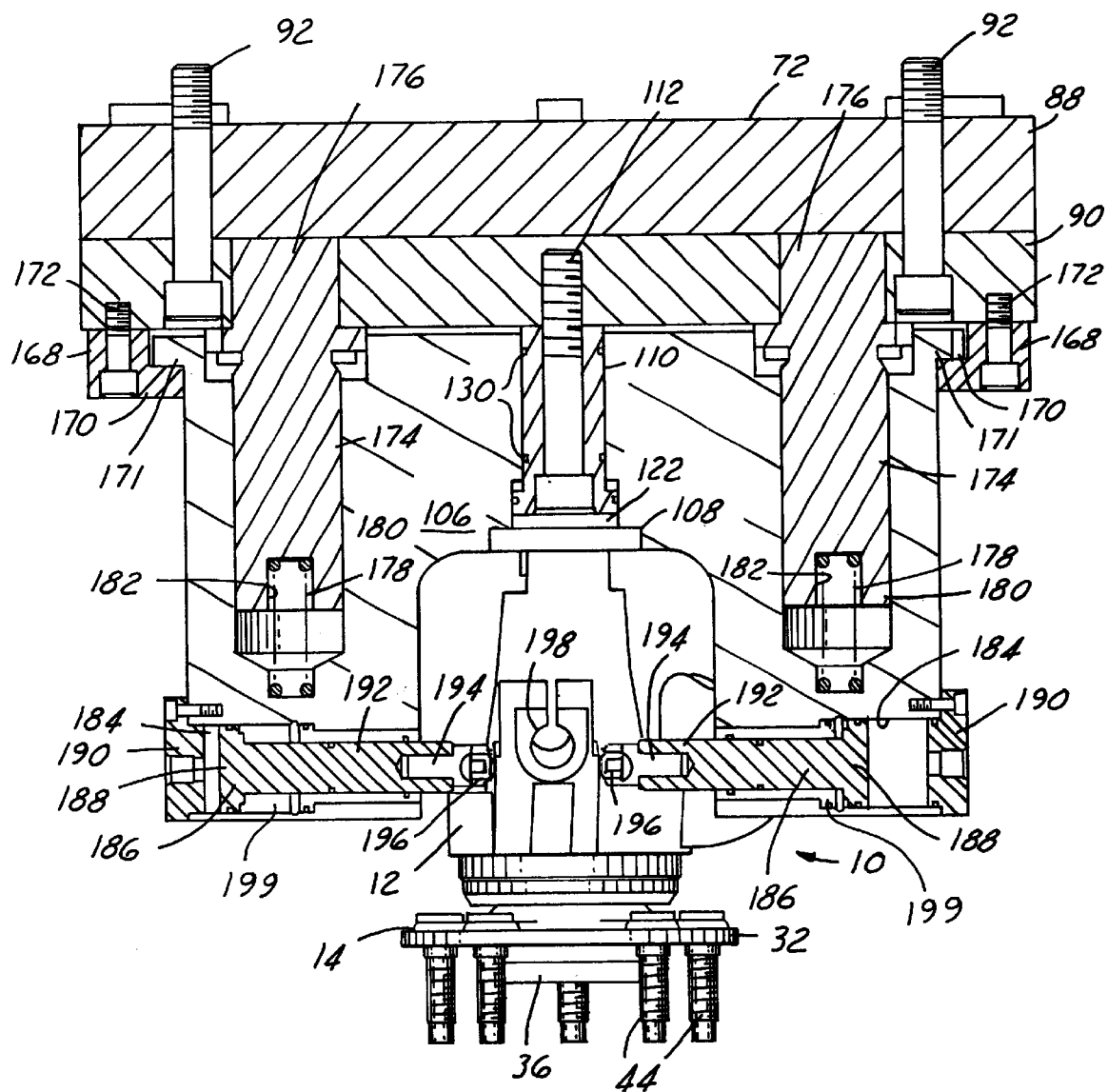
FIG. 12 is a cross-sectional view of the manufacturing fixture assembly, with a knuckle/hub assembly positioned therein, of FIG. 9 in the direction of the arrows 12—12.

Turning now to FIG. 12, which is a cross-sectional view of the fixture assembly 70 through the left housing portion 114. The left housing portion 114 is also retained in proximity with the base plate 90 by a pair of retaining blocks 168. Each of the retaining blocks 168 has a supporting portion 170 that engages a flange portion 171 of the left housing portion 114. Each of the retaining blocks 168 is secured to the base plate 90 by a fastener 172 or other securing means. A pair of guide pins 174 are disposed in the left housing portion 114. Each of the guide pins 174 is secured to the base plate 90 at an upper end 176 and each is in communication with a spring 178 at a lower end 180 of the guide pins 174. Each spring 178 fits within a recess 182 formed in the lower end 180 and extends downwardly into contact with the left housing portion 114. The biasing force from the springs 178 helps bias the left housing portion 114 away from the guide pins 174. The left guide pins 174 are preferably smaller in length and diameter than the right guide pins 142.

As also shown in FIG. 12, the left housing portion 114 includes a pair of bores 184 within which a respective piston 186 reciprocates. Each piston 186 moves between a normally unengaged position and a knuckle engaging position. The bores 184 are each sealed adjacent the outer ends 188 of the pistons 186 by a respective end cap 190. The inner ends 182 of each of the pistons 186 have a gripper portion 194 and a swiveling gripper portion 196 which allow the pistons 186 to engage and clamp the lower ball joint 198 of the knuckle 12 when the pistons 186 are in a knuckle engaging position. Each piston 186 reciprocates within a busing 188 secured within each bore 184 to ensure proper alignment of the gripper portion 194 and the swiveling gripper portion 196 with respect to the lower ball joint 198.

Figure 10:
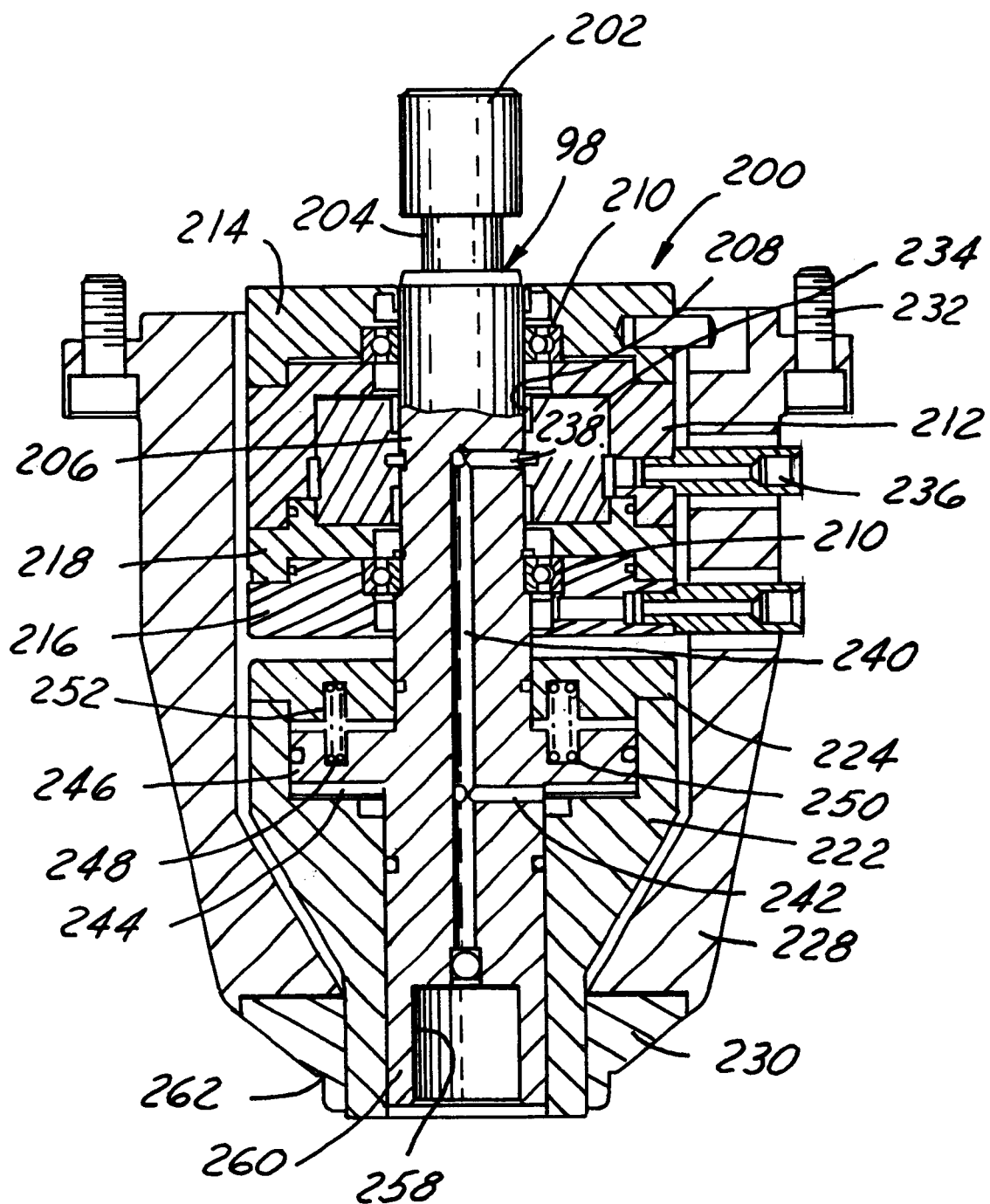
FIG. 10 is a cross-sectional view of a puller member of the manufacturing fixture assembly of FIG. 7 in the direction of the arrows 10—10.

Referring now to FIGS. 9 and 10, which illustrate the puller member 98 and the surrounding encasing 200. The puller member 98 has a head portion 202 around which the toothed gear 96 is located, a neck portion 204 which passes through the opening 104 in the u-joint adapter 102, and a stem portion 206 which is rotatable within a bore 208 formed in the surrounding encasing 200. The surrounding encasing 200 has a plurality of bearings 210 disposed around the bore 208 to assist in the rotation of the stem portion 206.

The encasing 200 includes an upper body portion 212 that has an upper end cap portion 214 disposed thereabove, a lower end cap portion 216 disposed therebelow, and a spacer portion 218 disposed between the upper body portion 212 and the lower end cap portion 216. The components of the upper body portion 212 are held together by a fastener 220 or other securing mechanism. The encasing 200 also includes a lower stop portion 222 which is secured to an upper end cap 224 by a fastener 226 or other securing mechanism. The upper body portion 212 and the lower stop portion 222 are surrounded by a body portion 228 having a stop portion 230 secured thereto. The encasing 200 is preferably secured to the underside of the base plate 90 by a plurality of fasteners 232, such as bolts or other securing mechanisms.

An upper reservoir 234 is preferably formed in the upper body portion 212. The upper reservoir 234 is in fluid communication with a fluid inlet port 236 for receiving hydraulic fluid therein. The upper reservoir 234 is also in fluid communication with a first fluid orifice 238 formed in the stem portion 206 of the puller member 98. The first fluid orifice 238 is in fluid communication with an internal fluid passageway 240 which is in fluid communication with a second fluid orifice 242 formed in the stem portion 206. Fluid that passes through the second fluid orifice 242 is passed into a lower reservoir 244. The lower reservoir 244 is formed between the lower stop portion 222 and the upper end cap 224.

The stem portion 206 has an annular flange 246 integrally formed thereon. The annular flange 246 is preferably disposed in the lower reservoir 244. The annular flange 246 and the upper end cap 224 are in mechanical communication through the inclusion of a plurality of springs 248 disposed in recesses 250, 252 formed in their respective surfaces and a spring drive pin 254. Thus, as hydraulic fluid enters the lower reservoir 244 through the second fluid orifice 242, the annular flange 246 is caused to move upward against the force of the springs 248.

In operation, a brake assembly 300 which is to be refinished in accordance with the process, as described in detail above, is located in the lathe and generally beneath the part clamping fixture 70. The brake assembly 300 is preferably resting on a pallet or other supporting structure with unobstructed passages. After the brake assembly 300 has been located on the pallet beneath the part clamping fixture 70, the bayonet 132 enters the spline 40 of the assembly 300 by passing up through the pallet upon which the assembly 300 is resting. The bayonet 132 is pressed upward until a shoulder portion 256 contacts the washer face 133 of the flange portion 32 forcing it upward. The assembly 300 is lifted by the bayonet 132 at least enough so that the wheel studs 44 are clear from the pallet 10.

Thereafter, the lathe lowers the puller member 98 and the puller encasing 200 through the opening 74 and into communication with the knuckle 12. The stem portion 206 of the puller member 98 has a recess 258 formed at its lower end 260 which is opposite the head portion 202. The recess 258 is non-uniform in diameter as in one orientation, it is large enough to receive a rounded top portion 260 of the bayonet 132 therewithin. However, when the stem portion 206 is rotated 90 degrees, its diameter is not large enough to receive the rounded top portion 260 therewithin or to allow the rounded top portion 260 to be withdrawn from the recess 258 if it is positioned therein. Thus, when the puller member 98 is lowered, it is oriented so as to receive the rounded top portion 260 therewithin.

After the puller member 98 and the puller encasing 200 have been lowered, the pair of right pistons 154 and the pair of left pistons 186 are hydraulically actuated in order to apply a pinching or clamping force to the knuckle 12. The right pistons 156 apply a clamping force to the opposing sides of the upper strut arm 155 through the use of the gripper portions 162 and the swiveling gripper portions 164. Similarly, the left pistons 186 apply a clamping force to the opposing sides of the lower ball joint 198 through the use of the gripper portions 192 and the swiveling gripper portions 196. The lifting of the assembly 10 by the bayonet 132 and the lowering of the puller member 98 forces the knuckle 12 into contact with the stop portion 230. The stop portion 230 has an annular shoulder 262 which engages knuckle 12. These actions locate the brake assembly 300 within the lathe and also fix the knuckle 12 to the lathe separately from any drive mechanism. Further, the knuckle 12 acted on by the pullers and grippers so that the knuckle is fixed and located. The knuckle 12 is not exposed to any bearing pre-load force.

After the assembly 300 is located, the bayonet 132 is engaged by rotating the puller member 98 and the puller encasing 200 with respect to the surrounding body portion 228. The puller member 98 and the puller encasing 200 are free to rotate with respect to the body portion 228 and are rotated 90° in order to engage the bayonet 132. Thereafter, a clamping force is introduced by applying pressure to the annular flange 236 by introducing hydraulic fluid into the lower reservoir 244 through the second fluid orifice 242 forcing the puller 20 upward. By pulling the puller member 98 up, the bayonet 132 is also pulled upward such that the lower stop portion 222 sits on the inner race 31 of the bearing 28 in order to apply a force thereto and thus preload the bearing 28.

After the assembly 300 has been located and clamped as described above, the final finishing process of the inner and outer surfaces of the brake rotor 46 can be performed by a finishing tool. In such a process, the hub 14 is driven such that it and the brake rotor 46 are rotating with respect to the knuckle 12 in which is fixed. The finishing tool is also preferably single tool such as a CNC tool, as is well known in the art. However, a variety of the other finishing tools may alternatively be utilized.

One of the features of the fixture assembly 70 is to turn the wheel hub 14, the brake rotor 46 and the bearing 28 compliantly, such that the stem portion 206 and the annular flange 246 are free to float and follow the brake assembly bearing's axis of rotation. This helps control the distance between the caliper ears and the rotor 46.

Figure 13:
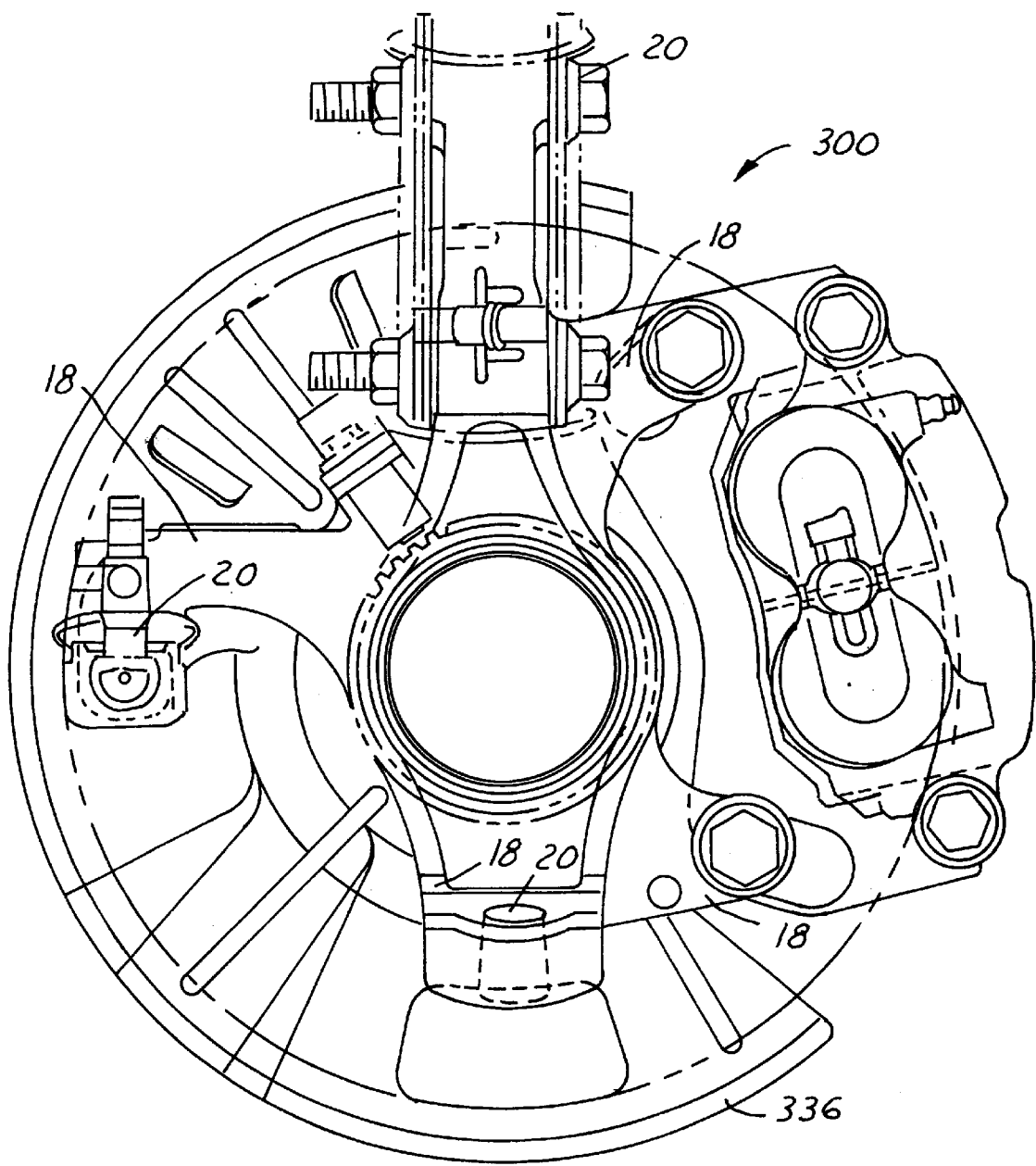
FIG. 13 is a rear view of a brake assembly in accordance with a preferred embodiment of the present invention.
Figure 14:
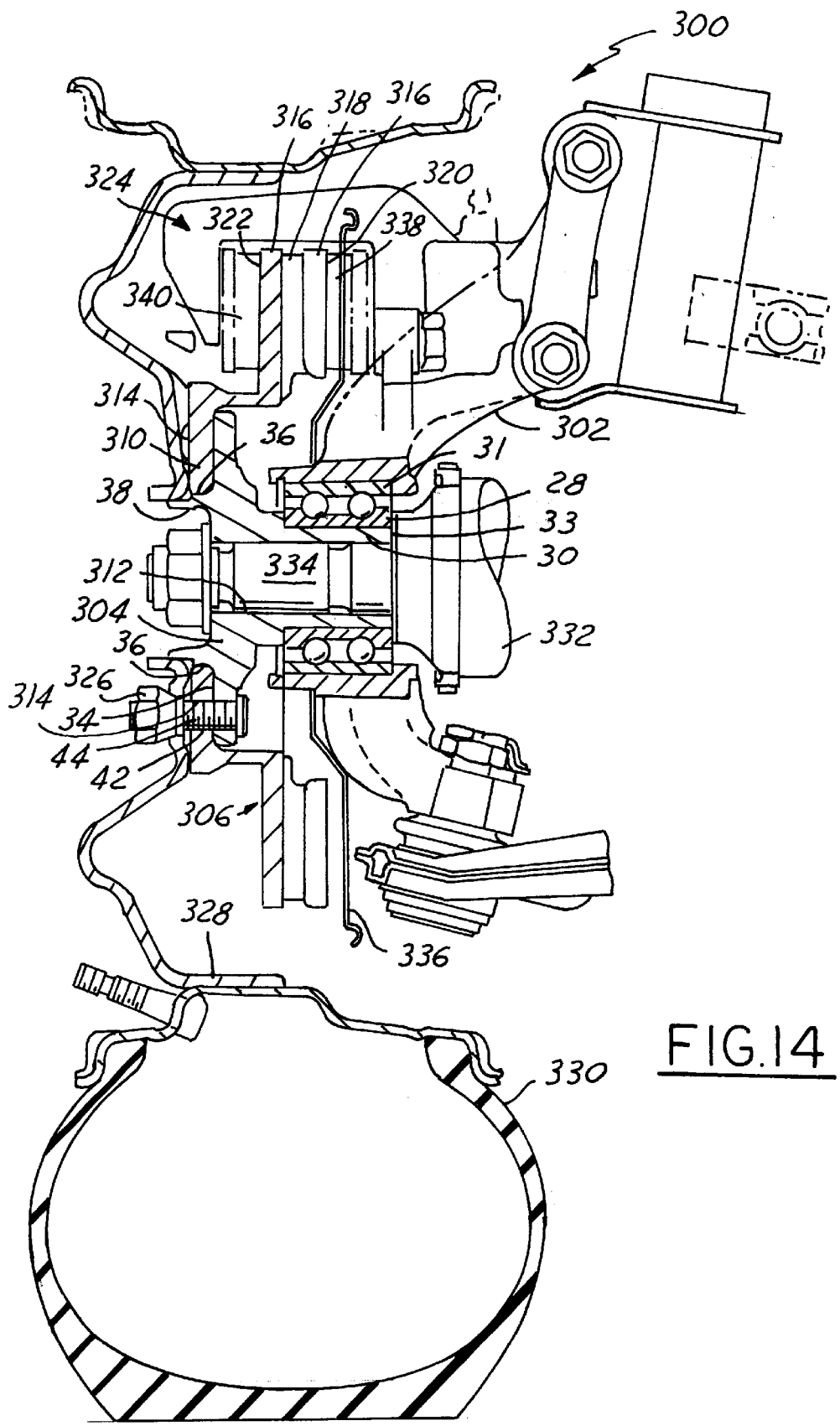
FIG. 14 is a cross-sectional side view of a brake assembly in accordance with a preferred embodiment of the present invention.

Referring now to FIGS. 13 and 14, which illustrate the brake assembly 300 in accordance with a preferred embodiment of the present invention. The brake assembly 300 includes a knuckle 302 and a wheel hub 304. The knuckle 302 and the wheel hub 304 have the same configuration as the knuckle 12 and the wheel hub 14 described in connection with FIGS. 1 through 13. Thus, like parts will be identified with similar reference numbers. In this embodiment, a brake rotor 306 is secured to the flange face 34.

The brake rotor 306 has a cup 310 with a central aperture 312 formed therein. The central aperture 312 is adapted to receive therethrough a wheel shaft, which is affixed to the wheel and the rotor pilot portions 36. The cup 310 extends generally actually from the flange face 34 and is dimensioned to receive the hub flange portion 32. The cup 310 includes at is outer end an annular flange 312 having a plurality of apertures 314 formed therein that lie in the same pitch circles diameter relative to the wheel shaft as the wheel bolts 44 and having a similar pattern so as to accommodate the wheel bolts thereto.

As shown in FIG. 14, the brake rotor 306 has a pair of parallel annular discs 316 spaced from each other by a plurality of rectangular fillets 318. The rectangular fillets 318 extend outwardly from the cup 310 and define an inner surface 320 and an outer surface 322 which act as braking surfaces for a brake caliper 324.

The brake assembly 300 in a fully assembled condition has the wheel bolts 44 pressed through the wheel hub 304, the knuckle 302 rotatably attached to wheel hub 304 by a bearing 28, and the brake rotor 306 secured to the flange face 34 of the wheel hub 34. The wheel bolt apertures 314 of the brake rotor 306 fit over the wheel bolts 44 with a respective lug nut 326 securing the brake rotor 306 fit over the wheel bolts 44 with a respective lug nut 326 securing the brake rotor 306 between the wheel 328 and the wheel hub 304. The wheel 328 has a wheel tread 330 secured to the outer surface thereof, as is well known. Further, a drive shaft axle 332 is in communication with a half shaft 334, which extends through the central aperture 312. A dust shield 336 is preferably secured to the knuckle 302 and extends generally outwardly such that it lies parallel and adjacent to the inner surface 320 of the brake rotor 306.

The brake caliper 324 is preferably disposed adjacent one portion of the brake rotor 306. The brake caliper 324 has a pair of caliper pads 338, 340 that contact the inner surface 320 and the outer surface 322 respectively of the brake rotor 306. The actuation of the brake caliper 324 and thus the caliper pads 338, 340 is well known in the art.

In accordance with the preferred method, the inner surface 320 and the outer surface 322 are subjected to a final finishing or refinishing. The final finishing is preferably the same as discussed above, in connection with the wheel hub 304. This refinishing process, as discussed above, minimizes lateral run-out of the rotor with respect to the center of rotation of the brake assembly 300. Further, the refinishing process allows for the control of distance between the caliper pads 338, 340 and the inner surface 320 and outer surface 322, respectively. To accomplish the refinishing process, the brake assembly 300 is preferably located into a lathe machine and is processed, as discussed above. It is preferred that the final finishing or re-finishing only be performed on the surfaces 320, 322 of the brake rotor. Alternatively, however, the final finishing process can be performed on both the flange face 34 of the wheel hub 304 and the surfaces of the brake rotor 306.

As discussed above, the brake assembly 10 is preferably inserted into the fixture assembly 70 in order to be properly finished such that the distance and parallelism between the brake caliper pads 338,340 and the surfaces 320,322 of the brake rotor is established.

Other objects and features of the present invention will become apparent when reviewed in light of detailed description of the preferred embodiment when taken in conjunction with the attached drawings and appended claims.

What is claimed is:

1. A method of forming a brake assembly including a knuckle, a wheel hub and a brake rotor, for a motor vehicle comprising:
   providing the wheel hub, said wheel hub having a neck portion and a flange portion, said flange portion having a flange face;
   forming a plurality of bolt receiving holes in said flange face;
   finishing said flange face in order to flatten said flange face out;
   placing said wheel hub in rotational communication with said knuckle;
   securing said brake rotor to said flange face of said wheel hub; and
   final finishing at least one surface of said brake rotor in order to reduce lateral run-out of said brake rotor.

2. The method of claim 1, wherein said step of final finishing includes forming said at least one surface of said brake rotor such that it is flat.

3. The method of claim 1, further comprising:
   locating the brake assembly into a fixture assembly prior to said step of final finishing.

4. The method of claim 1, further comprising:
   providing said knuckle having a bearing retention structure formed therein.

5. The method of claim 4, wherein said bearing retention structure is a generally circular bore formed in said knuckle.

6. The method of claim 5, further comprising:
   snap-fitting a bearing having an inner race and an outer race into said bore.

7. The method of claim 6, wherein said bearing is located in said bore between a lower shoulder portion and an upper snap ring.

8. The method of claim 5, wherein said bearing is only partially disposed in said bore.

9. The method of claim 1, further comprising:
   integrally forming an outer race of said bearing with said knuckle.

10. The method of claim 1, further comprising:
    integrally forming an inner race of said bearing with said neck portion.

11. The method of claim 1, wherein said brake rotor is secured to said wheel hub by a plurality of wheel bolts passed through a respective one of said plurality of bolt receiving holes.

12. A method of manufacturing a brake assembly, said brake assembly comprising a wheel hub, a knuckle and a brake rotor, the method comprising:
    providing said wheel hub having a neck portion and a flange portion;
    locating a bearing into a generally circular bore formed in said knuckle;
    journaling said neck portion of said wheel hub into said bearing to allow rotation of said wheel hub with respect to said knuckle;
    securing said brake rotor in communication with an outer surface of said wheel hub; and
    final finishing at least one surface of said brake rotor whereby lateral run-out of said brake rotor to one or more brake pads is minimized.

13. The method of claim 12, further comprising:
    forming a relief channel in a face of said flange portion and forming said plurality of bolt holes in said relief channel.

14. The method of claim 12, further comprising:
    finishing said at least one wheel hub outer surface prior to securing said brake rotor thereto.

15. The method of claim 12, further comprising locating said assembly in a clamping fixture.

16. The method of claim 12, further comprising:
    press-fitting a wheel bolt into each of said plurality of bolt receiving holes prior to said step of final finishing.

17. The method of claim 12, further comprising:
    press-fitting said bearing into said knuckle bore.

18. The method of claim 12, further comprising:
    integrally forming an outer race of said bearing with said knuckle.

19. The method of claim 12, further comprising:
    integrally forming an inner race of said bearing with said neck portion of said wheel hub.

20. The method of claim 12, wherein parallelism between said at least one surface of said rotor and a plurality of brake caliper ears is maintained.

21. A method of reducing the lateral run-out of a brake rotor in a brake rotor assembly, said brake rotor assembly comprising said brake rotor, a knuckle and a hub assembly, the method comprising:
    securing the brake rotor, having an inner contact surface and an outer contact surface, to said knuckle and said hub assembly to form the brake rotor assembly;
    fixing said brake rotor assembly such that the brake rotor can rotate with respect to said knuckle;
    final finishing said inner contact surface and said outer contact surface of said brake rotor.

22. The method of claim 21, further comprising:

controlling the distance between said inner contact surface and an inner brake caliper and between said outter contact surface and an outer brake caliper.

23. The method of claim 21, further comprising:

controlling parallelism between said inner contact surface and an inner brake caliper and between said outter contact surface and an outer brake caliper.

24. The method of claim 21, further comprising:

a bearing press-fit in said knuckle to allow rotation between said knuckle and said wheel hub.

25. The method of claim 21, further comprising:

integrally forming at least a portion of a bearing with said knuckle.

26. The method of claim 21, further comprising:

integrally forming at least a portion of a bearing with said wheel hub.

27. A method of reducing the lateral run-out of a brake rotor having an inner contact surface and an outer contact surface in a brake rotor assembly comprising said brake rotor, a knuckle and a hub, the method comprising:

rotatably attaching said wheel hub to said knuckle;

fixedly securing the brake rotor to said wheel hub to form the brake rotor assembly; and rotating the brake rotor with respect to said knuckle in order to finish the inner and outer contact surfaces.

28. The method of claim 27, further comprising:

fixing the brake assembly to a fixture assembly prior to finishing the inner and outer contact surfaces.

29. The method of claim 27, further comprising:

locating a bearing, having an inner race and an outer race, between said wheel hub and said knuckle.

30. The method of claim 29, further comprising:

press-fitting a bearing to said knuckle.

31. The method of claim 29, further comprising:

integrally forming said outer race with said knuckle.

32. The method of claim 29, further comprising:

integrally forming said inner race with said wheel hub.

* * * * *